United States Patent
Sikes

(10) Patent No.: US 7,053,170 B2
(45) Date of Patent: May 30, 2006

(54) PREPARATION OF HIGH MOLECULAR WEIGHT POLYSUCCINIMIDES

(75) Inventor: C. Steven Sikes, Eugene, OR (US)

(73) Assignee: Aquero Company, Eugene, OR (US)

( * ) Notice: Subject to any disclaimer, the term of this patent is extended or adjusted under 35 U.S.C. 154(b) by 295 days.

(21) Appl. No.: 10/630,585

(22) Filed: Jul. 29, 2003

(65) Prior Publication Data

US 2004/0072984 A1    Apr. 15, 2004

Related U.S. Application Data

(60) Provisional application No. 60/400,663, filed on Aug. 2, 2002.

(51) Int. Cl.
*C08G 73/10*    (2006.01)
*C07D 207/40*    (2006.01)

(52) U.S. Cl. ...................... 528/310; 548/546
(58) Field of Classification Search ............... 548/546; 528/310

See application file for complete search history.

(56) References Cited

U.S. PATENT DOCUMENTS

| 5,142,062 A | | 8/1992 | Knebel et al. | |
| 5,457,176 A | * | 10/1995 | Adler et al. | ................ 528/328 |
| 5,856,427 A | * | 1/1999 | Chou | ........................ 528/378 |

FOREIGN PATENT DOCUMENTS

| JP | 11240947 | * | 9/1999 |
| JP | 2001-302794 A2 | | 10/2001 |

* cited by examiner

*Primary Examiner*—Taofiq Solola
*Assistant Examiner*—Ebenezer Sackey
(74) *Attorney, Agent, or Firm*—LeeAnn Gorthey; Perkins Coie LLP

(57) ABSTRACT

Described are methods of production of polysuccinimides having molecular weights up to 200,000 daltons and higher. The polysuccinimides of the invention are essentially unbranched and uncrosslinked. They can be modified by crosslinking, ring-opening, and/or other functionalization, if desired, to form gelling materials of superior performance. The high Mw polysuccinimides are also particularly useful as thickening agents, viscosity modifiers, emollients, humectants and in other applications that are known in the art to be serviced most effectively by molecules of higher molecular weight.

15 Claims, No Drawings

PREPARATION OF HIGH MOLECULAR WEIGHT POLYSUCCINIMIDES

This patent application claims priority to U.S. Provisional Patent Application No. 60/400,663 filed on Aug. 2, 2002, which is incorporated herein in its entirety.

FIELD OF THE INVENTION

The present invention relates to a method of production of polysuccinimides, and in particular to production of polysuccinimides which are essentially unbranched and have molecular weights up to 200,000 daltons and higher.

REFERENCES

Adler, D. E., M. B. Freeman, J. M. Lipovsky, and Y. H. Paik. 1995. Acid catalyzed process for preparing amino acid polymers. U.S. Pat. No. 5,457,176.

Batzel, D. A., J. F. Kneller, and A. R. Y. Meah. 1996. Production of a polysuccinimide and derivatives thereof in the presence of a sulfur-containing dehydrating agent. U.S. Pat. No. 5,508,434.

Chou, Y. 1999. Process for production of polysuccinimide. U.S. Pat. No. 5,856,427.

Fox, S. W. and K. Harada. 1962. Thermal polymerization of amino acid mixtures containing aspartic acid or a thermal precursor of aspartic acid. U.S. Pat. No. 3,052,655.

Jacquet, B., C. Papantoniou, G. Land, S. Forestier, and C. Souilly. 1982. Polyaspartic acid derivatives, their preparation and their use in cosmetic composition. U.S. Pat. No. 4,363,797.

Irizato, Y., C. Higuchi, T. Ishitoku, K. Takuma, and K. Machida. 2001. Manufacture of polysuccinimides for use as precursor or intermediate in manufacture of polyaspartic acid. JP Kokai No. 2001-302794.

Kalota, D. J. and D. A. Martin. 1994. Preparation of polysuccinimide. U.S. Pat. No. 5,329,020.

Kato, T., M. Sukegawa, Y. Irizato, and H. Tamatani. 1999. Manufacture of polysuccinic acid imide used as intermediates for pharmaceuticals and cosmetics. JP Kokai No. 11-240947.

Kato, T., M. Sukekawa, Y. Irizato, and H. Tamatani. 2000. Manufacture of polysuccinic acid imide. JP Kokai No. 2000-169577.

Knebel, J. and K. Lehmann. 1992. Method of increasing the molecular weight in the manufacture of polysuccinimide. U.S. Pat. No. 5,142,062.

Mazo, G. Y., R. J. Ross, J. F. Kneller, and J. Mazo. 2001. Production of succinimide copolymers in cyclic carbonate solvent. U.S. Pat. No. 6,197,897.

Nagatomo, A., H. Tamatani, M. Ajioka, and A. Yamaguchi. 1996. Preparation process of polysuccinimide. U.S. Pat. No. 5,484,945.

Neri, P., G. Antoni, F. Benvenuti, F. Cocola, and G. Gazzei. 1973. Synthesis of α,β-poly[(2-hydroxyethyl)-DL-aspartamide], a new plasma expander. *J Med. Chem.* 16:893–897.

Ross, R. J., K. C. Low, and L. P. Koskan. 1996. Soluble, crosslinked polyaspartates. U.S. Pat. No. 5,552,516.

Sikes, C. S. 1999. Imide-free and mixed amide/imide synthesis of polyaspartate. U.S. Pat. No. 5,981,691.

Sikes, C. S. 2002. Copolymers of amino acids and methods of their production. PCT Appn. Ser. No. US03/14312.

Sikes, C. S., Ringsdorf, L. and Swift, G. 2002. Comonomer compositions for production of imide-containing polyamino acids. U.S. Pat. No. 6,495,658.

Tang, J. 1999. Biodegradable poly(amino acid)s, derivatized amino acid polymers and methods for making same. U.S. Pat. No. 5,929,198.

Wang, Y. 2000. Direct polyaspartate synthesizing process catalyzed by aspartic acid precursor. Chinese Patent No. 1267673.

Uenaka, M., S. Koshigaya-shi, and M. Tomida. 1977. Process for producing polysuccinimides and use of said compound. European Patent Application, EP 0791616 A1.

BACKGROUND OF THE INVENTION

Thermal polycondensation of aspartic acid and aspartic acid precursors, such as maleic acid plus ammonia, to produce polysuccinimide, which is then converted to polyaspartate by mild alkaline hydrolysis (see scheme below), has been the subject of commercial research and development for more than two decades. Much of this effort is summarized in U.S. Pat. Nos. 5,981,691 and 6,495,658 to Sikes and coworkers (1999, 2002) and in copending U.S. application Ser. No. 10/431,124 (PCT Application Ser. No. US03/14312) by Sikes, which are incorporated herein by reference.

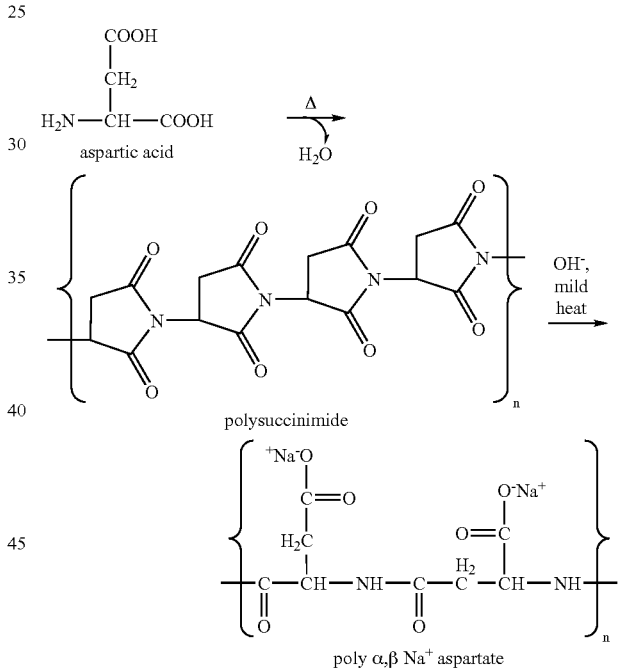

Generally, the polyaspartates formed by polysuccinimide ring opening comprise both D- and L-aspartate residues, and have amide linkages through both the α and β carboxylic groups, as shown, regardless of the stereochemistry of the aspartic acid (or aspartic acid precursor) monomers.

The principal commercial routes to polysuccinimides and polyaspartates now in use include the maleic acid/ammonia method and direct thermal conversion of aspartic acid monomer, as discussed in the above-referenced cases. These routes generate molecules of relatively low molecular weight (several thousand daltons), often having significant branching (branch points as frequent or more frequently as every tenth residue on average) and often ranging in color from light tan to a darker reddish color. Such molecules have been commercialized in specialty detergents and as environmentally friendly oilfield additives. However, many if not most markets often require or at least favor higher molecular weight polymers, if available.

Methods for preparing higher molecular weight polysuccinimides via acid catalysis have been developed. See, for example, Fox and Harada, 1962, U.S. Pat. No. 3,052,655; Neri et al., *J. Med. Chem.* 16, 893–897 (1973). The catalysts are typically phosphoric acid or polyphosphoric acid, employed at up to 50–65% by weight, relative to the aspartic acid monomer. In general, an admixture or paste of aspartic acid (powder or crystal) with the phosphoric catalyst is formed, then thermally polymerized, e.g. at 200 ° C. for 2–4 hours, to produce the polysuccinimide. Molecules in the range of 30,000 and somewhat higher are readily achievable via these methods. Color formation also tends to be suppressed under these conditions, resulting in polymers of favorable, off-white color.

However, the amount of phosphoric or polyphosphoric catalyst required for optimal reaction by this method can be very high. It is probable that the large quantities are needed to maintain acidic conditions in the reaction, preventing thermal decomposition of amino termini, which leads to chain termination. In addition, the hygroscopic phosphoric acid probably serves to remove water, a byproduct of the condensation reaction, thus promoting the reaction. Upon continued heating, this captured water could be vacated to the atmosphere (or the vapor space in the reactor), restoring the hygroscopic tendency of the phosphoric compound.

Later improvements in conjunction with this approach have included a two-stage reaction, in which an intermediate product is mechanically communited, followed by further condensation (Knebel et al., 1992, U.S. Pat. No. 5,141,062); addition of processing aids such as zeolites, sulfates, and bisulfates (Adler et al., 1995, U.S. Pat. No. 5,457,176); use of solvents such as diphenyl ether for azeotropic dehydration (Nagatomo et al. 1996, U.S. Pat. No. 5,484,945); addition of surfactants to further disperse and promote mixing of the reactants, intermediates, and products (Chou, 1999, U.S. Pat. No. 5,856,427); the use of super polyphosphoric acid (Tang, 1999, U.S. Pat. No. 5,929,198), and the use of cyclic propylene carbonate as a solvent (Mazo et al., 2001, U.S. Pat. No. 6,197,897). Knebel et al., cited above, reported non-crosslinked polysuccinimides having molecular weights greater than 100,000, using a process that requires interrupting polymerization, grinding (comminuting) a solid intermediate, and then continuing the polymerization. The molecular weights were determined by viscometric measurements, which tend to give higher values than gel permeation chromatography (GPC) measurements. Morphology of the products (i.e. linear or branched) was not reported.

Uenaka el al. (1997, EP 0791616 A1) employed triphenyl phosphite or tributyl phosphite as catalysts, along with organic solvents including acetone, mesitylene, and sulfolane. These authors reported production of polysuccinimides up to Mw 75,000.

Irizato et al. (2001, JP 2001302794 A2) taught a modification of traditional phosphoric acid catalyzed thermal polymerization of aspartic acid, in which a fluid mixture of aspartic acid in water, methanol, ethanol, or a combination of these solvents, along with the phosphoric catalyst, is formed. The mixture is atomized and spray-dried and simultaneously thermally polymerized. The polysuccinimides so produced were reported to range in Mw from 3,000 to 200,000.

Other approaches to generating polysuccinimides of higher Mw have employed various non-phosphoric acid catalysts. For example, gaseous carbon dioxide, which purges the reactor to carry away the water of condensation and also provides a mildly acidic environment, has been used to increase the Mw of product polysuccinimides (Kalota and Martin, 1994, U.S. Pat. No. 5,329,020). There is also a report of the use of benzene sulfonic acid as a catalyst during thermal production of higher Mw polysuccinimides (Wang, 2000, CN patent 1267673). In related approaches, Kato et al. (1999, 2000) polymerized aspartic acid in the presence of substoichiometric amounts of gaseous or aqueous HCl. If, in addition, an aprotic solvent was used (JP 11-240947 A2), these authors reported production of polysuccinimides up to Mw 60,000. In the absence of solvents, in other words by use of aqueous or gaseous HCl alone to provide acidic conditions, the Mw of the product polysuccinimides was reported to range up to 30,000 (JP 2000-169577 A2).

Other non-phosphoric methods have included the use of sulfur-containing dehydration agents during thermal polymerization, resulting in some higher Mw polysuccinimides of excellent light color (Batzel et al., 1996, U.S. Pat. No. 5,508,434). Another method employed mild crosslinking, sufficient to increase Mw, but insufficient to insolubilize the product polyaspartates that are produced from polysuccinimide via the aqueous, ring-opening procedure (Ross et al., 1996, U.S. Pat. No. 5,552,516).

In actual practice, prior art methods have generally produced polysuccinimides that range from about 10,000 to 30,000 in Mw, as measured by gel permeation chromatography (GPC) techniques. In addition, most studies have not addressed the molecular morphology of the products. Accordingly, there remains a need for a simple process for forming very high molecular weight, low color, substantially linear polysuccinimides.

SUMMARY OF THE INVENTION

In one aspect, the invention provides a method of preparing polysuccinimide by polymerization of aspartic acid. The method comprises the steps of:

(a) forming a solution of aspartic acid and a water soluble polymerization catalyst in an aqueous medium containing a volatile protic acid selected from the group consisting of hydrochloric acid, hydrobromic acid, and hydroiodic acid;

(b) drying the solution to give a solid residue; and (c) heating the residue at a temperature and for an amount of time sufficient to produce a polysuccinimide polymer.

In one embodiment, the protic acid is hydrochloric acid. The polymerization catalyst is preferably an acidic, hygroscopic compound, preferably selected from the group consisting of phosphoric acid (orthophosphoric acid), a polyphosphoric acid, phosphorus pentoxide, and combinations thereof.

In carrying out the process, the catalyst is preferably present in the aqueous solution in an amount between about 5% to 50% by weight, more preferably between about 20% to 30% by weight, of the amount of aspartic acid. The molar ratio of the protic acid (i.e. HCl, HBr, or HI) to aspartic acid in the solution is between about 1.0 and about 1.5. The drying step (b) is preferably carried out at a temperature between about 60° C. and about 160° C., and the heating step (c) is preferably carried out at a temperature between about 150° C. and about 350° C., and more preferably between about 180° C. and about 240° C.

In selected embodiments, the heating step (c) is carried out at a temperature and for an amount of time sufficient to produce a polysuccinimide polymer having a weight average molecular weight greater than 30,000, greater than 60,000, or greater than 100,000.

In another aspect, the invention provides a polysuccinimide polymer produced by process outlined in steps (a)–(c) above. In selected embodiments, the polymer has a weight average molecular weight greater than 100,000; in another embodiment, greater than 150,000. Preferably, the polymer has a substantially linear morphology, such that a branch point occurs fewer than once every 8 residues. In one embodiment, such a polymer has a weight average molecular weight greater than 100,000. In further preferred embodiments, the polymers are off-white to white in color.

DETAILED DESCRIPTION OF THE INVENTION

In accordance with the invention, very high molecular weight polysuccinimides can be prepared via a process in which the aspartic acid monomer is initially solubilized and combined, in solution, with an acidic, hygroscopic agent which functions as a catalyst in the polymerization reaction. The catalyst may be added to the solubilized monomer, or it may be added concurrently with the solubilizing agent, described below, or prior to the solubilization step. The solubilization of the monomer as described herein allows more intimate contact between the monomer and acidic catalyst upon drying of the reaction mixture, prior to polymerization. The polymers can have molecular weights up to 200,000 daltons or more, as determined by GPC (gel permeation chromatography), e.g. as described in "Materials and Methods" below.

A. Solubilization of Aspartic Acid Monomer

Commercial aspartic acid is available as a crystalline zwitterionic material, as shown below. The zwitterion is precipitated from the mildly alkaline ammonium aspartate solutions that are formed during the commercial synthesis of aspartic acid via enzymatic conversion of ammonium fumarate to ammonium aspartate. To produce the solid product, the solution is acidified to promote precipitation of the aspartic acid crystals. When the pH reaches the isoelectric point at slightly less than pH 3, the β-carboxyl group is fully neutralized to the carboxylic acid form ($pK_a$~3.9) while the α-carboxyl group remains in the anionic carboxylate form ($pK_a$~2.1). The amine group is fully associated as the cationic $NH_3^+$ (pK~9.8).

amounts or in slight excess, will quickly bring aspartic acid into aqueous solution, particularly with mild heating. In these solutions, the aspartic acid is fully acidified, with both of the carboxylic groups in the acidic COOH form and the amine positively charged as $NH_3^+$. In the absence of counterionic $COO^-$ groups, no crystal lattice is formed.

Upon drying of such a solution, however, the anionic counterions (e.g. sulfate or nitrate) remain to block the amine groups, making them unavailable for amide formation with the unblocked carboxylic groups. This is the converse of the above-mentioned cationic blocking of the carboxylate groups, and therefore again is not an acceptable situation for successful thermal polymerization.

Consequently, the preferred solubilizing agents, either acidic or basic, are those which do not leave blocking counterions as components of the dried composition. The preferred solubilizing acid is a volatile acid, such as hydrochloric acid (bp −85° C.), hydrobromic acid (bp −67° C.), or hydroiodic acid (bp −35° C.), where hydrochloric acid is preferred. Upon dissolution in water, the gas (e.g. HCl) strongly dissociates as the acid; upon drying, the gas vents to the atmosphere, leaving no residue, and reducing acidity by forcing the reaction to the left:

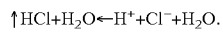
$\uparrow HCl+H_2O \leftarrow H^+ +Cl^- +H_2O$.

Preferably, a small molar excess of acid, e.g. HCl, is employed relative to aspartic acid in the dissolution process, producing a mildly acidic solution which can be safely employed in commercial settings, provided the acid is properly metered into the aspartic acid slurry and then recaptured upon drying of the intimate mixture of aspartic acid crystals and catalyst.

An analogous alkaline solubilizing agent is ammonia, also a small neutral gas. When dissolved in water, it strongly associates to produce the alkaline solution of ammonium hydroxide. Upon drying, again the gas vents to the atmosphere, leaving no residue, and reducing alkalinity conditions by forcing the reaction to the left:

$\uparrow NH_3+H_2O \leftarrow NH_4^+ +OH^- +H_2O$.

However, because a mildly alkaline solution is formed in this case, some portion of the acidic reaction catalyst (typically phosphoric acid) will be converted to dihydrogen

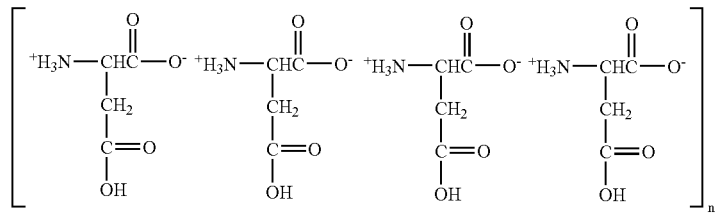

salt of zwitterionic aspartic acid molecules

In this form, the crystals are quite insoluble in water, even with heating. They can be solubilized via addition of alkali to a slurry in water, producing an aqueous solution of sodium (or other cation) aspartate. However, thermal polymerization of this product is unsuccessful, as the sodium counterions block the carboxylate groups from forming amide bonds with the amine groups.

Aspartic acid is also soluble in relatively strong acids. For example, sulfuric or nitric acids, added in equimolar phosphate ($H_3PO_4 \leftarrow H^+ +H_2PO_4^-$). On drying to form the intimate mixture of aspartic acid and catalyst, any excess dihydrogen phosphate anions can ionically block the cationic $NH_3^+$ groups of the aspartic molecules and prevent amide formation of the polyamino acid backbone, in the manner described above.

Accordingly, the use of an aqueous solution of a volatile acid is the preferred solubilization method. Preferably, for each mole of aspartic acid to be dissolved, about 0.5 to 1.5 moles of acid, preferably HCl, is employed. A molar excess of HCl can be used to expedite dissolution. Most preferably, a small excess of HCl is used; e.g. about 1.2–1.3 mole of HCl per mole of aspartic acid.

The concentration of aspartic acid in the aqueous solution preferably ranges from 1% to 60% by weight, more preferably 10% to 50 by weight, most preferably 20 to 40% by weight.

Another aspartic acid solubilization method that does not suffer from the drawback of blocking counterions, as described above, is the use of electrolysis of water to generate the $H^+$ ions needed to solubilize the aspartic acid zwitterionic crystals. In this modification, a small equimolar excess (similar to the molar ratios described above) of hydrogen ion relative to aspartic acid monomer is generated electrolytically, by use of commercial electrodialysis units, into a compartment that contains the aspartic acid crystals in aqueous suspension. A solution forms, which is then pumped to a vessel into which the catalyst is metered.

B. Acidic Catalyst

Prior to, concurrent with, or preferably, following solubilization of the monomer as described above, an acidic catalyst, which preferably also functions as a hygroscopic agent, is added, to produce an acidic reaction mixture.

Typically, the catalyst is a phosphorus-containing acid, such as phosphoric acid ($H_3PO_4$, also known as orthophosphoric acid), metaphosphoric acid, diphosphoric acid (also known as pyrophosphoric acid), or polyphosphoric acid, which is provided commercially (e.g. by Aldrich) as a mixture of tri- and higher phosphoric acids. Any of these may also be used in combination with each other or with phosphorus pentoxide. A catalyst known as super polyphosphoric acid comprises a combination of polyphosphoric acid and phosphorus pentoxide (see Tang, cited above). Other acidic catalysts have also been used in aspartic acid polymerization, including acidic ion exchange resins (Jacquet et al., U.S. Pat. No. 4,363,797), $CO_2$ (Kalota et al., cited above) and benzene sulfonic acid (Wang, cited above). Other acidic, hygroscopic compounds that may be employed as catalysts include triphenyl or trialkyl phosphites, e.g. tributyl phosphite (Uenaka et al. 1997, EP 0791616 A1), sulfonic acids, e.g. benzenesulfonic acid, toluenesulfonic acid, or methyl sulfonic acid (Wang, 2000, CN patent 1267673), and other sulfur compounds, including sulfur trioxide, sulfuric acid, fuming sulfuric acid, sulfamic acid, polysulfuric acid, and salts thereof (Batzel et al., 1996, U.S. Pat. No. 5,508,434). In general, any effective acidic catalyst, preferably a hygroscopic catalyst, can be used in the methods described herein. Preferably, phosphoric or polyphosphoric acid is used; most preferably, polyphosphoric acid is used. The catalyst is dissolved in the solution of aspartic acid in an amount relative to aspartic acid which is preferably 1% to 150% by weight, more preferably 5% to 50% by weight, and most preferably 20% to 30% by weight. As shown below, increasing the amount of catalyst from 10% to 20% to 30% produced a corresponding increase in the molecular weight of the product polymer. Molecular weights can also be varied by variation in reaction temperature and time of the final polymerization step, described below.

The solubilization produces a homogenous aqueous solution (that is, having no substantial amount of undissolved components) containing aspartic acid, the volatile dissolved acid, the polymerization catalyst(s), and water. Preferably, no other components are present in any significant amount; in particular, no organic solvents are required.

C. Drying

The combined solution of aspartic acid and catalyst is then dried, to remove water and more volatile components, e.g. HCl or other acid gas, to give a substantially solid residue. Drying is carried out, for example, by heating at about 60–160° C., preferably about 80–140° C., and more preferably at about 120° C., for a sufficient time to produce a dried intimate mixture of monomer and catalyst. Evolved HCl or other gas may be trapped, e.g. by use of a water trap, if needed.

Drying techniques include those known in the art, such as sparging with hot air, forced-air convection, spray drying, rotary evaporation, vacuum drying, or thin layer convection. Preferred methods include forced-air convection and spray drying. Upon drying, an intimate composition of aspartic acid plus catalyst is produced.

D. Polymerization

The residue from the above drying process is then thermally polymerized, to produce polysuccinimides of Mw up to 200,000 and higher. Polymerization may be carried out by heating in conventional commercial convection ovens, vacuum ovens, tray driers, or high-viscosity reactors such as extruders and co-rotating processors, using forced air or vacuum to carry away the vapors of condensation bond formation and other vapors that may occur. Preferably, high viscosity reactors and tray driers are used. Most preferably, high viscosity reactors are used.

The temperature of thermal polycondensation is preferably between about 150–350° C., more preferably between about 170–240° C., and most preferably between about 180–200° C. The time of the polymerization reaction preferably ranges between about 3 minutes, for the highest range of temperatures, to 24 hours, for the lower temperatures. More preferably, the time of polymerization ranges between about 20 minutes and 6 hours, and most preferably, between about 30 minutes and 2 hours.

The above-described methods can be used to produce polysuccinimides having weight average molecular weights up to about 200,000 or higher, as shown in the Examples below, and also having excellent light color and substantially linear morphology. Desired molecular weights can be obtained by variation in reaction temperature and time.

The products are readily purified of catalyst by successive washings with water, each washing followed by filtration or centrifugation. The polymers may be further purified and dried, if desired, by techniques known in the art, such as dialysis with drying by lyophilization.

EXAMPLES

The following Examples serve to illustrate but not to limit the invention.

Materials and Methods.

Conversion of the polysuccinimides to the corresponding polyaspartates. The polysuccinimides were ring-opened via mild alkaline hydrolysis by addition of 1 equivalent of NaOH per equivalent of succinimide residues to slurries of the polymers in water. The polymers were weighed, then added to beakers containing distilled water, with smooth magnetic stirring. The alkaline conditions were held at pH 10 by autotitration or manual pipetting, with the temperature at 80° C. as set by use of a thermostated water bath.

Typically, under these mild conditions, the polysuccinimides were converted to the polyaspartates within approximately 1 hour.

Molecular weight. The molecular weights of the polyaspartates were determined by gel permeation chromatography (GPC), with commercial polyaspartates and polyacrylates as standards. In addition, the molecular weights of specific copolymers were measured by mass spectroscopy (matrix-assisted, laser desorption (MALDI MS) with time-of-flight detector), and then used themselves as standards for GPC determinations.

Color. The color of the polysuccinimides and their corresponding polyaspartates, both as solids and aqueous solutions, was assessed by visual comparison to color standards (ASTM) available from commercial sources. In addition, the ultraviolet and visible light spectra of standard aqueous solutions of the copolymers were compared to indicate the intensity of color development at particular wavelengths.

Molecular morphology. Branching versus linearity of the polyaspartates was assessed in two ways. The first employed an advanced method in atomic force microscopy. The second utilized quantitative titration of the C-terminal, carboxylic end-groups of polysuccinimide molecules. The number of end groups as compared to the known molecular weight of the molecules can provide an indication of the number of branches, as each branch has an end group.

Atomic force microscopy. First, a novel method of atomic force microscopy (AFM) was used to visually inspect the appearance of the molecules at the nanometer and angstrom levels. The method involved first immobilizing the polymers at the surfaces of calcite crystals by allowing the polymers to embed themselves partially at growing crystal surfaces by placement of functional groups of the polymers into lattice positions of the crystal surface. The polymers, so immobilized and held tightly to an atomically flat surface, were then imaged via contact-mode AFM in solution. The visually evident differences between branched versus unbranched molecules were clear.

Infrared spectroscopy. The infrared spectra of polysuccinimides and polyaspartates were determined by use of conventional IR spectrophotometers equipped with attenuated total reflectance. The spectra revealed the characteristic imide and amide peaks, thus indicating the occurrence of succinimide and aspartate residues.

Titration. Quantitative alkalimetric titrations of the polysuccinimides over the pH range of 2.5 to 7.0 were made by use of an automated titrator. The amount of alkali that was consumed over this range indicated the amount of titratable groups of aspartic acid per unit weight of the polymers.

Amino acid analysis. The polyaspartates were hydrolyzed via acid treatment to produce the monomeric constituents. These were then treated to form their phenylthiohydantoin derivatives by use of phenylisothiocyanate. The derivatized residues were next assessed via reverse-phase, liquid chromatography and identified by comparison to chromatograms of standards of the amino acids, also so treated. This method generated quantitative data of the amount of aspartic acid residues per unit weight of the polymers. This provided an indication of the relative amount of non-aspartic residues in the polymers, such as might occur as end groups due to thermal decomposition of the amino termini.

Example 1

Polyphosphoric Catalysis of Synthesis of Polysuccinimides via Thermal Polycondensation of HCl-solubilized Aspartic Acid Amounts of 0.01 mole of L-aspartic acid (1.33 g) were added to each of a set of 50-ml beakers. The aspartic acid (zwitterionic form, Sigma Chemical) was dissolved in 13.3 ml of 1 N HCl (1 mmol per ml, total of 0.013 mole, Fisher Chemical), at room temperature with smooth magnetic stirring.

To 3 of these beakers was added 10% by weight of the aspartic acid as polyphosphoric acid. This was added by pipetting 0.133 g or 0.066 ml of polyphosphoric acid (Aldrich Chemical, specific gravity ~2.0) into each beaker, first warming both the polyphosphoric acid and the pipette to 80° C. to render the acid much less viscous and more easily pipettable.

To another 3 of the beakers was added 20% by weight of the aspartic acid as polyphosphoric acid. This was added by pipetting 0.266 g of polyphosphoric acid as above.

To the last 5 of the beakers was added 30% by weight of the aspartic acid as polyphosphoric acid. This was added as above by pipetting 0.399 g of polyphosphoric acid.

The solutions of aspartic acid plus polyphosphoric acid were dried at 120° C. overnight in a small, conventional convection oven placed in a fume hood. This resulted in clear, glassy pucks of intimate mixtures of aspartic acid and the catalyst.

These dried intimate mixtures were next thermally polymerized at 180° C. in the beakers in the same oven. Samples (as 1 beaker from each treatment) were taken from 1 to 7 hours of heating for each of the levels of catalyst, 10, 20, and 30% by weight.

The resulting polysuccinimides were washed of the catalyst by stirring with distilled water, centrifuging (3000 g for 10 minutes), this treatment repeated 3 times. Each sample was then lyophilized to produce a light powder.

The polysuccinimides were next ring-opened to produce stock solutions of sodium polyaspartates via mild alkaline hydrolysis. These stock solutions were used for determination of molecular weight via gel permeation chromatography.

Example 2

Phosphoric-acid Catalysis of Synthesis of Polysuccinimides via Thermal Polycondensation of HCl-solubilized Aspartic Acid The procedures and methods of Example 1 were followed except for use of phosphoric acid (15% by weight water, 85% phosphoric acid, Aldrich Chemical) rather than polyphosphoric acid. Thus, for the 10% by weight treatments, 0.156 g of the reagent (0.133 g as phosphoric acid) or 0.093 ml (specific gravity 1.685) was pipetted. Accordingly, 0.313 g (0.266 g, 0.186 ml) for the 20% by weight treatments, and 0.470 g (0.399 g, 0.279 ml) for the 30% by weight treatments were pipetted.

The visual appearance and molecular weights of the product polymers were similar to those of Example 1, as exemplified in Table 1.

Comparative Example 1

Phosphoric Acid and Polyphosphoric Acid Catalyzed Synthesis of Polysuccinimides, via Thermal Polycondensation of Zwitterionic Aspartic Acid, not Solubilized The amounts of phosphoric acid and aspartic acid as indicated in example 2 were used, but the aspartic acid was not solubilized. Rather, a paste of the aspartic acid (zwitterionic) and the catalyst was made by thoroughly mixing them manually by use of a spatula, the mixture having been warmed to 80° C. by use of a thermostated heating plate. The paste was then thermally polymerized at 190° C. The optimal reaction time under these conditions was 4.5 to 6 hours. The maximum molecular weight of polysuccinimide that was produced was approximately 30,000 daltons. If the amounts of the catalyst were increased to >30% by weight of the aspartic acid, the molecular weights of the resulting polysuccinimides were decreased into the range of 10,000 daltons. Similar results were obtained when polyphosphoric acid was used to make the paste with aspartic acid, zwitterionic monomer.

Comparative Example 2

Phosphoric Acid Catalyzed Synthesis of Polysuccinimides via Thermal Polycondensation of Zwitterionic Aspartic Acid, Solubilized by Addition of NaOH The aspartic acid was readily brought into solution by titration with NaOH to produce a clear, aqueous solution at pH 5. To solutions of this type were pipetted the various amounts of phosphoric acid as indicated in example 2. Upon addition of the phosphoric acid at levels above 15% by dry weight of the aspartic acid, a large amount of precipitate of the contents of the solution formed. Thus the addition of phosphoric acid in this treatment was limited to 15%.

Following drying, the intimate mixture was thermally polymerized. Polyaspartates of very low molecular weight (less than 2,000 daltons) were produced. Polysuccinimides were not produced, as shown by the lack of the imide signal in the infrared spectra, owing to the presence of sodium cations that blocked the ring-closure to form the imide residues.

Comparative Example 3

Phosphoric Acid Catalyzed Synthesis of Polysuccinimides via Thermal Polycondensation of Zwitterionic Aspartic Acid, Solubilized by Addition of $NH_4OH$ The protocol as described in comparative example 2 was followed with the addition of phosphoric acid in the amount of 15% by weight of the aspartic acid. In this case, however, the aspartic acid was first solubilized by addition of ammonium hydroxide to produce a clear solution of aspartic acid at pH 5. Again a precipitate occurred upon addition of the phosphoric acid at levels above 15% by dry weight of the aspartic acid.

In these experiments, no sodium counterions were present to block imide formation, and the products formed were polysuccinimides as indicated by the infrared spectra. However, again, the molecular weights were quite low, presumably now due to blockage of free $R-NH_3^+$ groups by the anionic dihydrogen phosphate anions ($pK_a=2.1$; $H_3PO_4 \leftarrow H_2PO_4^- + H^+$) in the dry intimate mixture prior to polymerization.

Comparative Example 4

Thermal Polymerization of Aspartic Acid, not Solubilized, with no Catalyst, 180° C.

Amounts of 0.01 mole of L-aspartic acid (1.33 g, zwitterionic form, Sigma Chemical) were added as the dry powders to each of a set of 50-ml beakers. These were then placed in a convection oven at 180° C. and polymerized for 2 to 24 hours. The resulting products were mixtures of unreacted monomer, oligomers, and polysuccinimides. The temperature in this case was too low to effectively condense the monomer to the polymeric form in high yield, even after 24 hours of the thermal treatment.

Comparative Example 5

Thermal Polymerization of Aspartic Acid, not Solubilized, no Catalysis, 220° C.

The procedure of comparative example 4 was followed. The resulting products after about 4 hours of heating were almost fully converted to the polysuccinimides. The polysuccinimides were ring-opened by mild alkaline treatment to produce sodium polyaspartates, which were then assessed for Mw by gel permeation. These polyaspartates were relatively small, in the range of 3,000 to 5,000 Daltons.

Comparative Example 6

Thermal Polymerization of HCl-solubilized Aspartic Acid, no Catalysis, 220° C.

The procedure of example 1 was followed except that no phosphoric catalyst was used. The aspartic acid was fully solubilized via the treatment with HCl, but then was reprecipitated, presumably mainly as the zwitterion, upon removal of HCl on drying. After 4 hours at 220° C., the products were essentially fully converted to polysuccinimides. The Mw's of the resulting polyaspartates ranged from about 2–3 KDa.

TABLE 1

Molecular weights of polyaspartates derived from polysuccinimides produced via conventional phosphoric acid catalysis and via HCl solubilization plus phosphoric acid catalysis

|  | Treatment | Reaction Time, hours at 180° C. | Elution Volume, ml at 1 mL/min | Estimated Mw |
|---|---|---|---|---|
| Example 1 | Aspartic acid | 2 | 8.3 | 7,400 |
|  | HCl solubilized, 10% polyphos | 4 | 8.1 | 12,000 |
|  |  | 7 | 8.1 | 12,000 |
|  | Aspartic acid | 2 | 7.7 | 28,000 |
|  | HCl solubilized, 20% polyphos | 4 | 7.6 | 33,000 |
|  |  | 7 | 7.5 | 38,000 |
|  | Aspartic acid | 1 | 6.63 | 110,000 |
|  | HCl solubilized, 30% polyphos | 2 | 6.48 | 122,000 |
|  |  | 3 | 6.29 | 136,000 |
|  |  | 4 | 5.82 | 172,000 |
|  |  | 6 | 5.74 | 178,000 |
| Example 2 | Aspartic acid | 1 | 6.56 | 116,000 |
|  | HCl solubilized, 30% phosphoric | 2 | 6.40 | 128,000 |
|  |  | 3 | 6.19 | 144,000 |
|  |  | 4 | 6.27 | 138,000 |

TABLE 1-continued

Molecular weights of polyaspartates derived from polysuccinimides produced via conventional phosphoric acid catalysis and via HCl solubilization plus phosphoric acid catalysis

| Treatment | | Reaction Time, hours at 180° C. | Elution Volume, ml at 1 mL/min | Estimated Mw |
|---|---|---|---|---|
| Comparative Example 1 | Aspartic acid not solubilized, 10% phosphoric | 2<br>4<br>7 | 8.5<br>8.4<br>8.2 | 4,200<br>6,000<br>8,200 |
| | Aspartic acid not solubilized, 20% phosphoric | 2<br>4<br>7 | 8.2<br>8.1<br>8.0 | 8,200<br>12,000<br>16,000 |
| | Aspartic acid not solubilized, 30% phosphoric | 2<br>4<br>7 | 8.0<br>7.9<br>7.7 | 16,000<br>20,000<br>28,000 |
| Comparative Example 2 | Aspartic acid, NaOH solubilized, 15% phosphoric | 4 | 8.8 | <2,000 |
| Comparative Example 3 | Aspartic acid, NH$_4$OH solubilized, 15% phosphoric | 4 | 8.8 | <2,000 |
| Comparative Example 4 | Aspartic acid Not solubilized No catalyst, 180° C. | 4 | In-complete reaction | Not applicable |
| Comparative Example 5 | Aspartic acid, Not solubilized, No catalyst, 220° C. | 4 | 8.5 | 4,000 |
| Comparative Example 6 | Aspartic acid, HCl-solubilized, No catalyst, 220° C. | 6 | 8.65 | ~2,000 |

TABLE 2

Gel permeation standards for assessment of molecular weights of thermal polymers of aspartic acid.

| Standard | Elution volume, ml at 1 ml/min | Molecular weight |
|---|---|---|
| $^-$O-(aspartate)$_5$-NH$_3^+$ solid-phase standard | 9.2 | 593 |
| Polyaspartate | 8.6 | 2,300 |
| Polyaspartate | 8.4 | 6,000 |
| Polyaspartate | 8.2 | 8,200 |
| Polyaspartate | 7.72 | 28,000 |
| Polyglutamate | 7.27 | 61,600 |
| Polyglutamate | 6.96 | 86,000 |
| Polyacrylate | 4.9 | 1,000,000 |

The invention claimed is:

1. A method of preparing a polysuccinimide polymer, comprising:
   (a) forming a solution of aspartic acid and a water soluble polymerization catalyst in an aqueous medium further containing a volatile protic acid selected from the group consisting of hydrochloric acid, hydrobromic acid, and hydroiodic acid;
   (b) drying the solution to give a solid residue; and
   (c) heating the residue at a temperature and for an amount of time sufficient to produce a polysuccinimide polymer.

2. The method of claim 1, wherein the protic acid is hydrochloric acid.

3. The method of claim 1, wherein the polymerization catalyst is an acidic, hygroscopic compound.

4. The method of claim 3, wherein the catalyst is selected from the group consisting of phosphoric acid (orthophosphoric acid), a polyphosphoric acid, phosphorus pentoxide, and combinations thereof.

5. The method of claim 4, wherein the catalyst is present in said solution in an amount between about 5% to 50% by weight of the amount of aspartic acid.

6. The method of claim 4, wherein the catalyst is present in said solution in an amount between about 20% to 30% by weight of the amount of aspartic acid.

7. The method of claim 1, wherein the molar ratio of protic acid to aspartic acid in said solution is between about 1.0 and about 1.5.

8. The method of claim 1, wherein said drying is carried out at a temperature between about 60° C. and about 160° C.

9. The method of claim 1, wherein said heating is carried out at a temperature between about 150° C. and about 350° C.

10. The method of claim 9, wherein said heating is carried out at a temperature between about 180° C. and about 240° C.

11. The method of claim 1, wherein said heating is carried out at a temperature and for an amount of time sufficient to produce a polysuccinimide polymer having a weight average molecular weight greater than 30,000.

12. The method of claim 11, wherein said heating is carried out at a temperature and for an amount of time sufficient to produce a polysuccinimide polymer having a weight average molecular weight greater than 60,000.

13. The method of claim 12, wherein said heating is carried out at a temperature and for an amount of time sufficient to produce a polysuccinimide polymer having a weight average molecular weight greater than 100,000.

14. A polysuccinimide polymer having a weight average molecular weight greater than 150,000, and a substantially linear morphology, such that a branch point occurs fewer than once every 8 residues.

15. The polymer of claim 14, wherein said polymer is off-white to white in color.

* * * * *